2,941,978

TRANSPARENT COMPOSITIONS OF POLYVINYL-XYLENE AND RUBBERY BUTADIENE-STYRENE COPOLYMERS

Arthur F. Roche, Freeland, and Norman R. Ruffing, Midland, Mich., assignors to The Dow Chemical Company, Midland, Mich., a corporation of Delaware No Drawing. Filed Aug. 12, 1957, Ser. No. 677,788

5 Claims. (Cl. 260—45.5)

This invention concerns thermoplastic compositions of polyvinylxylene and rubbery copolymers of butadiene and styrene. It relates more particularly to transparent compositions which are blends of a hard normally solid thermoplastic polymer of vinylxylene and a rubbery copolymer of butadiene and styrene.

It is known to incorporate natural rubber, polybutadiene or a rubbery copolymer of butadiene with polystyrene by milling or compounding the ingredients together on heated rolls or in a plastic mixer to obtain compositions which can readily be molded by usual compression or injection molding operations to form plastic articles suitable for a variety of purposes.

However, such compositions are opaque or translucent masses and this property detracts from their utility for many of the purposes for which they are otherwise well suited.

It has now been discovered that thermoplastic compositions suitable for the manufacture of transparent or substantially transparent plastic articles can readily be obtained by intimately incorporating with a hard normally solid thermoplastic homopolymer of vinylxylene or a copolymer of a predominant amount of vinylxylene and a minor proportion of a monovinyl aromatic hydrocarbon such as vinyltoluene or styrene, a rubbery copolymer of butadiene and styrene having the same or substantially the same refractive index.

It is important that the refractive indices of the normally solid vinylxylene polymer and the relatively soft rubbery copolymer of butadiene and styrene starting materials be substantially the same at ordinary temperatures, e.g. at temperatures between about 32° F. and 104° F., in order that the compositions be transparent or substantially transparent in ordinary use. Copolymeric starting materials having refractive indices within 0.005 of one another, preferably within 0.002, at room temperature are usually required in order to obtain compositions which can be injection molded to form transparent or substantially transparent plastic articles, e.g. boxes.

The normally solid thermoplastic vinylxylene polymer to be employed as starting material can be a homopolymer of vinylxylene, e.g. 2,4-dimethylstyrene or 3,5-dimethylstyrene, or a copolymer of from 55 to 99 percent by weight of vinylxylene and from 45 to 1 percent of vinyltoluene or styrene. The vinylxylene polymers are normally solid resinous products having a molecular weight corresponding to a viscosity characteristic between 10 and 25 centipoises as determined for a 10 weight percent solution of the polymer in toluene at 25° C., and a refractive index $n_D^{25}$ between 1.559 and 1.575.

The rubbery copolymer of butadiene and styrene can be a copolymer of from 30 to 50 percent by weight of butadiene and from 70 to 50 percent of styrene which rubbery copolymer has a refractive index between 1.559 and 1.575, and is within 0.005, preferably within 0.002, of the refractive index of the vinylxylene polymer employed. The copolymers can be prepared in usual ways, e.g. by polymerizing a mixture of the monomers in the desired proportions in an aqueous emulsion to obtain a synthetic latex or aqueous colloidal dispersion of the copolymer. The copolymer is recovered from the latex in usual ways, e.g. by adding a strong electrolyte such as sodium chloride or aluminum sulfate or magnesium sulfate to coagulate the latex and separating the copolymer from the aqueous liquid, or by heating a layer of the latex on rolls to evaporate the water or by spray drying the latex and collecting the dried copolymer solids.

The compositions of the invention consist of from 90 to 60 percent by weight of the hard normally solid vinylxylene polymer intimately incorporated with from 10 to 40 percent by weight of the rubbery copolymer of butadiene and styrene, the polymeric ingredients making up at least 90 percent by weight of the final composition, any balance being made up of plasticizers, stabilizers, antioxidants, lubricants, flow agents, pigments, dyes, coloring agents and the like.

The compositions can be prepared by intimately blending the ingredients with one another on heated rolls, a Banbury mixer or in a plastic extruder to obtain a uniform composition. The hard vinylxylene polymer is usually heat-plastified on compounding rolls or in a plastic mixer and extruder and the heat-plastified mass intimately mixed and mechanically worked with the rubbery copolymer at temperatures between 140° and 280° C. until the polymeric ingredients are uniformly dispersed with one another to form a homogeneous composition. Thereafter, the composition is cooled and cut or ground to a granular form.

Small amounts of additives such as plasticizers or lubricants, e.g. butyl stearate white mineral oil, or dibutyl phthalate, having a boiling point above 200° C. at atmospheric pressure, or fillers, pigments, stabilizers, antioxidants, may be incorporated with the polymeric ingredients, but are not required. The additives, when used are usually employed in total amount corresponding to not more than 10 percent by weight of the final composition, preferably 5 percent by weight or less.

The compositions of the invention can be molded to form transparent plastic articles such as boxes, cups, sheets, films, toys, combs, etc., useful for a variety of purposes.

The following examples illustrate ways in which the principles of the invention have been applied, but are not to be construed as limiting its scope.

EXAMPLE 1

A charge of 190 grams of poly-2,4-dimethylstyrene having a refractive index $n_D^{25}$ 1.568, a molecular weight corresponding to a viscosity characteristic of 13.7 centipoises (determined on a 10 weight percent solution of the polymer in toluene at 25° C.) and containing 0.4 percent by weight of volatile material was heat-plastified by milling the same on a pair of 3-inch diameter by 8 inches long laboratory rolls. Thereafter, the heat-plastified poly-2,4-dimethylstyrene was compounded with 108 grams of a rubbery copolymer of 45 percent by weight of butadiene and 55 percent of styrene, which copolymer had a refractive index $n_D^{25}$ 1.563, and 2 grams of white mineral oil as lubricant. The ingredients were milled together on the rolls at a temperature of 160° C. for a period of 10 minutes. The product was sheeted out, removed from the rolls and cooled to room temperature. The composition was ground to a granular form. Portions of the composition were injection molded to form test pieces of ⅛ x ½ inch cross section by 6½ inches long. These test pieces were employed to determine the tensile strength and percent elongation values for the composition employing procedures similar to those described in ASTM D638–49T. Impact strength was determined by procedure similar to ASTM D256–47T. Other molded test pieces were employed to determine the heat distortion temperature by a procedure of Heirholzer and Boyer, see ASTM Bull. No. 145, of May 1945. The composition had the properties:

| | |
|---|---|
| Tensile strength lbs/sq. in. | 4050 |
| Elongation percent | 13.9 |
| Impact strength (unnotched) ft.-lbs. | 0.8 |
| Heat distortion temperature °C. | 93 |
| Color | Transparent |

EXAMPLE 2

A charge of 190 grams of a copolymer of 73 percent by weight of 3,5-dimethylstyrene and 27 percent styrene having a refractive index $n_D^{25}$ 1.568, a molecular weight corresponding to a viscosity characteristic of 14.8 centipoises (10 weight percent solution of the copolymer in toluene at 25° C.) and containing 0.4 percent of volatile material was heat-plastified by milling the same on a pair of laboratory compounding rolls. The copolymer was compounded with 108 grams of a rubbery copolymer of 40 percent by weight of butadiene and 60 percent of styrene, having a refractive index $n_D^{25}$ 1.568 and 2 grams of white mineral oil as lubricant for a period of 10 minutes at a temperature of 160° C., then cooled to room temperature and ground to a granular form. Portions of the composition were injection molded and tested employing procedures similar to those employed in Example 1. The composition had the properties:

| | |
|---|---|
| Tensile strength lbs/sq. in. | 3670 |
| Elongation percent | 22.9 |
| Impact strength (unnotched) ft.-lbs. | 3.4 |
| Heat distortion temperature °C. | 80 |
| Color | Transparent |

Similar transparent compositions can be prepared by intimately incorporating a normally solid copolymer of from 55 to 99 percent by weight of 3,5-dimethylstyrene and from 45 to 1 percent of styrene having a refractive index between $n_D^{25}$ 1.560 and $n_D^{25}$ 1.570 with a rubbery copolymer of from about 30 to 60 percent by weight of butadiene and from 70 to 40 percent of styrene, which rubbery copolymer has a refractive index between $n_D^{25}$ 1.555 and $n_D^{25}$ 1.575 and is within 0.005 of the refractive index of the hard copolymer of 3,5-dimethylstyrene.

We claim:

1. A transparent composition of matter comprising from 60 to 90 percent by weight of a normally solid thermoplastic vinyl aromatic polymer selected from the group consisting of homopolymers of vinylxylene and copolymers of vinylxylene with a monovinyl aromatic hydrocarbon which is a member of the group consisting of styrene and vinyltoluene, which vinyl aromatic polymer has a refractive index between $n_D^{25}$ 1.559 and $n_D^{25}$ 1.575, intimately incorporated with from 40 to 10 percent by weight of a rubbery copolymer of from 30 to 50 percent by weight of butadiene and from 70 to 50 percent of styrene, which rubbery copolymer has a refractive index between $n_D^{25}$ 1.559 and $n_D^{25}$ 1.575, and within 0.005 of that of the vinyl aromatic polymer.

2. A composition as claimed in claim 1, wherein the vinyl aromatic polymer is a homopolymer of vinylxylene.

3. A composition as claimed in claim 1, wherein the vinyl aromatic polymer is a copolymer of vinylxylene and styrene.

4. A transparent composition of matter comprising from 60 to 90 percent by weight of a normally solid homopolymer of 2,4-dimethylstyrene intimately incorporated with from 40 to 10 percent by weight of a rubbery copolymer of from 30 to 50 percent by weight of butadiene and from 70 to 50 percent of styrene, having a refractive index between $n_D^{25}$ 1.559 and $n_D^{25}$ 1.575 and within 0.005 of that of the 2,4-dimethylstyrene polymer.

5. A transparent composition of matter comprising from 60 to 90 percent by weight of a normally solid copolymer of from 55 to 99 percent by weight of 3,5-dimethylstyrene and from 1 to 45 percent of styrene intimately incorporated with from 40 to 10 percent by weight of a rubbery copolymer of from 30 to 50 percent by weight of butadiene and from 70 to 50 percent of styrene, having a refractive index between $n_D^{25}$ 1.559 and $n_D^{25}$ 1.575 and within 0.005 of that of the 3,5-dimethylstyrene copolymer.

References Cited in the file of this patent

UNITED STATES PATENTS

| 2,574,439 | Seymour | Nov. 6, 1951 |
| 2,614,093 | Wheelock | Oct. 1, 1952 |